J. T. WESTWOOD.
WHEEL BRAKE.
APPLICATION FILED APR. 11, 1914.
1,138,707.
Patented May 11, 1915.
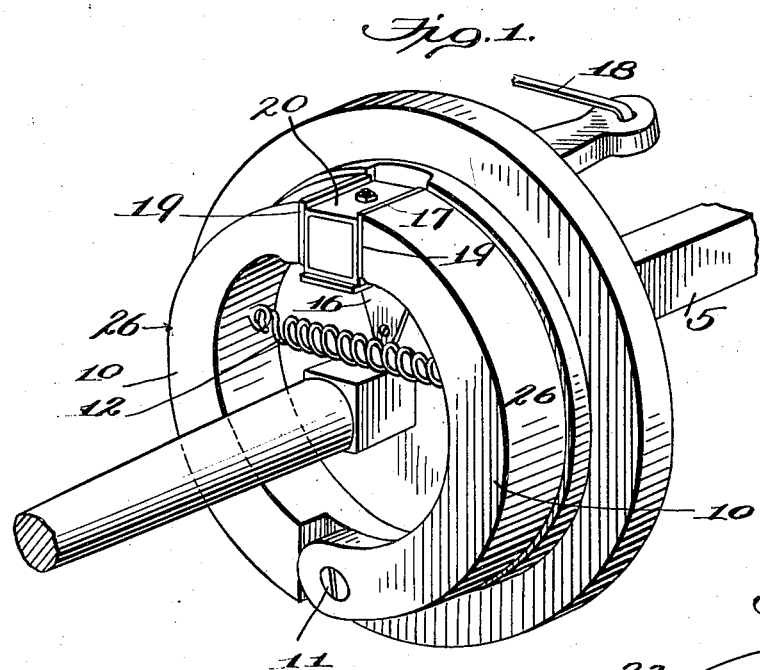
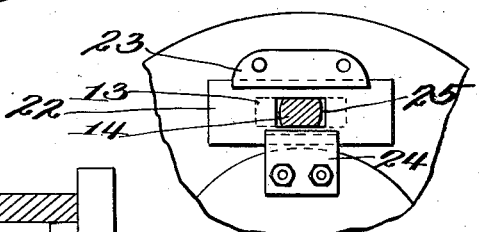
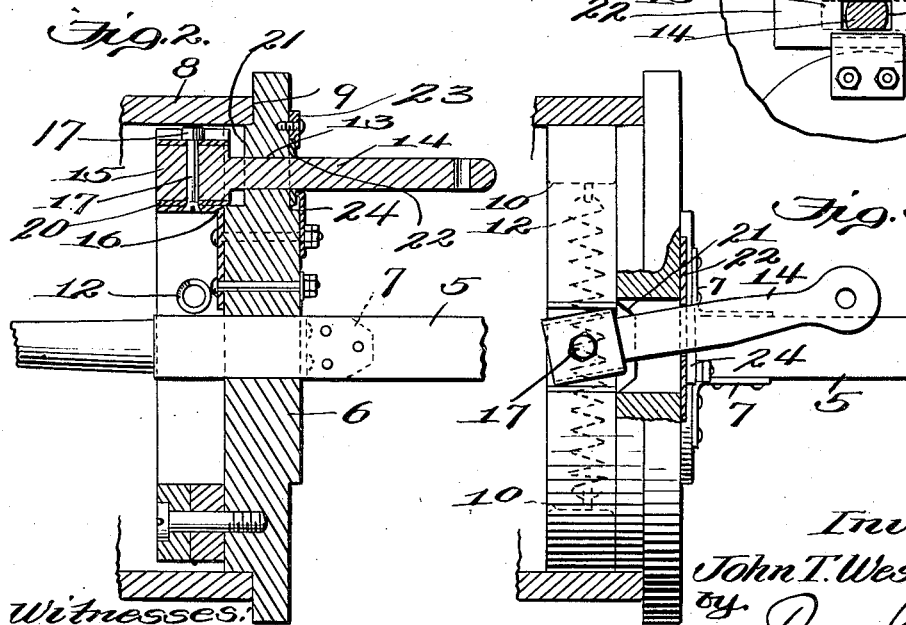
Witnesses.
Inventor
John T. Westwood
by
James L. Norris
Attorney.

UNITED STATES PATENT OFFICE.

JOHN T. WESTWOOD, OF WHEELING, WEST VIRGINIA, ASSIGNOR OF ONE-FOURTH TO JAMES B. SOMERVILLE AND ONE-FOURTH TO GEORGE C. BENEKE, OF WHEELING, WEST VIRGINIA.

WHEEL-BRAKE.

1,138,707.   Specification of Letters Patent.   Patented May 11, 1915.

Application filed April 11, 1914.   Serial No. 831,212.

*To all whom it may concern:*

Be it known that I, JOHN T. WESTWOOD, a citizen of the United States, residing at Wheeling, in the county of Ohio and State of West Virginia, have invented new and useful Improvements in Wheel-Brakes, of which the following is a specification.

This invention relates to improvements in wheel brakes of that type applied to the hub of a wheel and adjacent portion of an axle, and the primary object of the same is to provide a brake of this class which may be economically manufactured and applied without interfering with the spokes or other wheel fittings of the usual kind of motor driven vehicle or automobile and having a positive operation or braking action without liability of injuring the several parts frictionally engaged in the actuation of the brake elements.

With these and other objects and advantages in view the invention consists in the preferred construction and arrangement of parts which will be more fully hereinafter described and claimed.

In the drawing: Figure 1 is a perspective view of the essential elements of the improved brake and a portion of an axle. Fig. 2 is a transverse vertical section through the brake elements as shown by Fig. 1 and a portion of the hub of a wheel. Fig. 3 is a top plan view, partially broken away and in section, of the improved brake elements and a portion of the hub of a wheel and axle. Fig. 4 is a detail elevation of a portion of the improved brake looking toward the inner side thereof and partially in section to illustrate a sliding dust guard.

The numeral 5 designates an axle of any preferred or approved type as now commonly used, and thereto is secured a disk or brake head 6 by any suitable means, such for instance as an angle bracket 7. The axle 5 projects through the center of the disk or head 6 and outwardly far enough from the latter to receive the wheel, which in the present instance will have a hub provided with an inwardly projecting brake coördinating element or collar 8 having its inner edge snugly fitted in a recess or offset portion 9 of the disk or head 6. On the outer side of the disk or head 6, segmental dogs or frictional elements 10 are mounted and have their lower ends reduced and overlapped and pivoted, as at 11, the said dogs being normally held contracted or released from braking position by a spring 12 secured to the upper portions of the inner opposing sides above the axle 5, as clearly shown by Fig. 1. In the upper part of the disk or head 6 and freely movable in an opening 13 therethrough is a brake actuating lever 14 having an inner rectangular head 15 supported by an angle bracket 16 secured to the disk or head above the axle 5, the head 15 of the lever being pivoted to the angle bracket 16 by a pin 17 extending vertically through the center thereof. The lever 14 extends inwardly away from the disk or head 6 any suitable distance and will have a braking lever or other actuating device 18 attached thereto, as shown by Fig. 1. The usual form of brake actuating levers or connections will be used in connection with this brake and be readily operable from a point adjacent to the seat of a driver or chauffeur of an automobile or similar motor vehicle. The opening 13 through which the lever 14 extends is sufficiently elongated to permit the said lever to be oscillated in a horizontal plane to move the head 15 a sufficient distance to set up a braking action of the dogs 10. The head 15 of the lever is located between and loosely engages the upper free ends of the dogs 10 and is free to work or oscillate in opposite directions so that the improved brake may be readily applied in right and left position without modifying the structure thereof. The dogs 10 may be made of a medium hard metal, and the upper free ends may be harder metal plates 19 secured thereto to avoid wear thereon. The head 15 of the lever 14 has what may be termed an extension sleeve 20 fitted thereover, and of the same contour as the said head to provide a practical contact projection of the head relatively to the ends of the dogs to insure a positive action or engagement of the head relatively to the dog ends with which it engages and between which it is located. The sleeve 20 may be of suitable thickness and may be replaced when desired or found necessary and thereby preserve the brake in sensitive operating condition or so that the dogs will quickly respond to the actuation of the lever 14 and its head 15. To accommodate the maximum swing or oscillation of the head 15 of the lever, the upper portion of the disk or head 6 is recessed as at 21 and normally the upper ends of the dogs 10 are held in square and firm contact with the opposite side portions of the sleeve 20 fitted over the head 15. At the point where the lever 15 projects through the upper portion of the disk or head 6 and over the opening 13, a sliding dust guard 22 is mounted between upper and lower clips 23 and 24, as clearly shown by Fig. 4, the said dust guard having a central opening 25 therein for the passage of the lever 14 therethrough. As the lever 14 is operated the dust guard 22 moves therewith and the greater portion of the opening 13 is thus closed and the entrance of dust and grit into the improved brake is materially prevented, with advantages in the operation of the brake elements.

In the operation of the brake the lever 14 is drawn at an angle to the axle 5 below, as shown by Fig. 3, and diagonally opposite corners of the head 15 are brought to bear on corresponding corner portions of the upper ends of the dogs 10 or the plates 19 on the said dog ends, and by this means the dogs are forced apart against the resistance of the spring and the outer surfaces 26 thereof are brought to forcefully bear upon the inner surface of the wheel hub collar 8 and the moment that the lever 14 is released the head 15 thereof returns to normal position and the dogs 10 are drawn inwardly by the spring 12 to cause their upper free ends to squarely and positively engage the opposite side portions of the said head.

It will be seen from the foregoing that by a minimum movement of the brake 14 the dogs 10 will be forcefully separated to set up a frictional engagement with the hub collar 8 owing to the two points of contact of the head with the dogs at diagonally opposite points and which sets up a uniformity in the expansion of the dogs and a strong frictional contact with the hub collar 8 to check the movement or rotation of the wheel.

The improved brake is comparatively inexpensive in the cost of manufacture and may be easily applied to any axle and wheel now in use by simply securing the bracket 7 to the axle and fitting the ordinary hub collar 8 over the dogs 10 against the disk or head 6.

It will be understood that changes in the proportions, dimensions and minor details of the several parts may be adopted at will to suit various applications of the improved brake.

What is claimed is:

1. In a brake of the class specified, the combination with an axle having a head secured thereto and a wheel hub collar, of segmental dogs pivoted on the head and having upper free ends normally drawn in close relation, and a lever movably extending through the head and having a rectangular extremity pivoted between the upper free ends of the dogs, the lever and its rectangular extremity having a horizontal oscillating movement and said extremity engaging the dogs at diagonally opposite points to expand the said dogs against the collar.

2. In a brake of the class specified, the combination with an axle having a disk secured thereon and a hub collar applied against the disk, dogs having ends pivotally secured to the outer side of the disk within the collar, a horizontally disposed lever extending through the upper portion of the disk and having a rectangular head pivotally mounted between the upper ends of the dogs, and a spring connected to the inner opposing portions of the dogs above the axle to hold the free ends of the dogs normally in close engaging contact with the opposite side portions of the head of the lever.

3. In a brake of the class specified, the combination with an axle having a disk secured thereon and a wheel hub collar fitted thereagainst around the axle, segmental dogs pivoted at their lower ends to the disk and having upper free ends, and a horizontally disposed oscillating lever having a rectangular head pivoted between the upper free ends of the dogs and operative so that the diagonally opposite corners thereof will engage corresponding portions of the free ends of the dogs and uniformly expand the latter against the inner surface of the collar.

4. In a brake of the class specified, the combination with an axle having a disk secured thereon and a wheel hub collar disposed against the outer side thereof around the axle, of a pair of segmental dogs pivotally mounted against the outer side of the disk and having their upper free ends normally drawn toward each other, a horizontally disposed oscillating lever extending through the disk and having a pivotally mounted head between the upper free ends of the dogs, and an extension sleeve removably mounted on the head of the lever to directly engage the opposite faces of the free ends of the dogs.

5. In a brake of the class specified, the combination with an axle having a disk secured thereon and a wheel hub collar disposed against the outer side thereof around the axle, a pair of segmental dogs pivotally mounted against the outer side of the disk and having free ends normally drawn toward each other, a horizontally disposed oscillating lever extending through the disk and having a pivotally mounted head of angular form disposed adjacent to the free ends of the dogs, and an extension sleeve of the same form and removably mounted on the head of the wheel to directly contact with the free ends of the dogs and operating to provide a positive contact between the lever and the dogs to preserve a sensitive operation of the brake at all times.

6. In a brake of the class specified, the combination with an axle having a disk secured thereon and a wheel hub collar disposed against the outer side of the disk around the axle, of spring-actuated segmental dogs pivoted on the outer side of the disk within the collar and adapted to engage the latter, the upper portion of the disk having an elongated opening therethrough, a horizontally disposed lever extending through the opening in the disk and having a head pivotally mounted between the upper free ends of the dogs, the said lever and its head being oscillatable in opposite directions, and a sliding dust guard mounted against the inner side of the upper portion of the disk over the opening in the latter and through which the said lever also extends.

In testimony whereof I have hereunto set my hand in presence of two subscribing witnesses.

JOHN T. WESTWOOD.

Witnesses:
C. E. MORRIS,
CARL O. SCHMIDT.